(12) United States Patent
Matsushima

(10) Patent No.: US 10,419,678 B2
(45) Date of Patent: Sep. 17, 2019

(54) IMAGING CONTROL APPARATUS AND METHOD FOR CONTROLLING THE SAME

(71) Applicant: CANON KABUSHIKI KAISHA, Tokyo (JP)

(72) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,286

(22) Filed: Dec. 19, 2017

(65) Prior Publication Data

US 2018/0184007 A1 Jun. 28, 2018

(30) Foreign Application Priority Data

Dec. 27, 2016 (JP) ................ 2016-254228

(51) Int. Cl.
| | |
|---|---|
| *H04N 5/232* | (2006.01) |
| *H04N 5/225* | (2006.01) |
| *H04N 5/262* | (2006.01) |
| *G06F 3/048* | (2013.01) |
| *G02B 15/14* | (2006.01) |
| *G03B 5/00* | (2006.01) |

(Continued)

(52) U.S. Cl.
CPC ....... *H04N 5/23293* (2013.01); *G06F 3/0488* (2013.01); *H04N 5/23212* (2013.01); *H04N 5/23216* (2013.01); *H04N 5/23296* (2013.01); *H04N 5/232935* (2018.08); *H04N 5/232945* (2018.08); *H04N 5/2628* (2013.01); *G06F 3/0482* (2013.01); *G06F 3/04817* (2013.01)

(58) Field of Classification Search
CPC ........... H04N 5/23293; H04N 5/23216; H04N 5/23212; H04N 5/23112; H04N 5/225; H04N 5/232935; H04N 5/232945; H04M 5/23216; H04B 5/232935; G02B 15/14; G03B 5/00; G06F 3/0488
USPC ............ 348/333.05, 333.09, 333.11, 333.01, 348/208.6, 211.9, 240.99, 240.1, 240.2, 348/240.3, 345, 347, 208.12, 326, 346, 348/333.02; 396/79, 80, 82, 104, 121, 396/124, 150, 296, 379; 382/255; 345/173, 619, 629, 671, 472.2, 594; 715/700
See application file for complete search history.

(56) References Cited

U.S. PATENT DOCUMENTS 8,208,056 B2 6/2012 Fujio et al.
8,704,856 B2 4/2014 Misawa et al.
(Continued)

FOREIGN PATENT DOCUMENTS

JP 2012-060567 A 3/2012
JP 2016-163104 A 9/2016

*Primary Examiner* — Marly S Camargo
(74) *Attorney, Agent, or Firm* — Canon U.S.A., Inc. IP Division

(57) ABSTRACT

A method for switching between a live view display state where two separate areas are enlarged and a live view display state where the entire imaging area is displayed, with good operability. In response to a first operation on a first operation unit in a state of 2-area enlargement display for displaying live view images respectively captured in two horizontally or vertically separated imaging areas, side by side, control is performed to cancel the 2-area enlargement display and display an entire live view image captured by the imaging unit. In response to a second operation on the first operation unit, control is performed to resume the 2-area enlargement display.

35 Claims, 8 Drawing Sheets

(51) Int. Cl.
    *G06F 3/0488*     (2013.01)
    *G06F 3/0482*     (2013.01)
    *G06F 3/0481*     (2013.01)

(56) References Cited

U.S. PATENT DOCUMENTS

| | | |
|---|---|---|
| 9,001,255 B2 | 4/2015 | Matsuzawa et al. |
| 9,323,432 B2 | 4/2016 | Kang et al. |
| 10,015,404 B2 * | 7/2018 | Hara ................. H04N 5/23293 348/333.03 |
| 2007/0242143 A1 | 10/2007 | Sugimoto |
| 2007/0285534 A1 | 12/2007 | Makioka |
| 2008/0025712 A1 | 1/2008 | Furuya |
| 2012/0229675 A1 | 9/2012 | Yamamoto |
| 2013/0155308 A1 | 6/2013 | Wu et al. |
| 2013/0300674 A1 | 11/2013 | Davidson |
| 2014/0160233 A1 | 6/2014 | Ishida |
| 2015/0264253 A1 * | 9/2015 | Takagi ............... H04N 5/23216 348/333.01 |
| 2016/0044235 A1 | 2/2016 | Cho et al. |
| 2016/0295130 A1 | 10/2016 | Mølgaard et al. |
| 2017/0034428 A1 | 2/2017 | Kwon et al. |
| 2017/0034449 A1 | 2/2017 | Eum et al. |
| 2017/0054913 A1 | 2/2017 | Hara |
| 2017/0183996 A1 | 6/2017 | Baker et al. |
| 2017/0199620 A1 * | 7/2017 | Ishitsuka ................. G06F 3/041 345/173 |
| 2017/0278217 A1 | 9/2017 | Takahashi |
| 2017/0318226 A1 | 11/2017 | Jung et al. |
| 2018/0013957 A1 | 1/2018 | Irie et al. |
| 2018/0183996 A1 * | 6/2018 | Takahashi .......... H04N 5/23245 348/333.05 |
| 2018/0184008 A1 | 6/2018 | Kondo |
| 2018/0234630 A1 | 8/2018 | Kondo |

\* cited by examiner

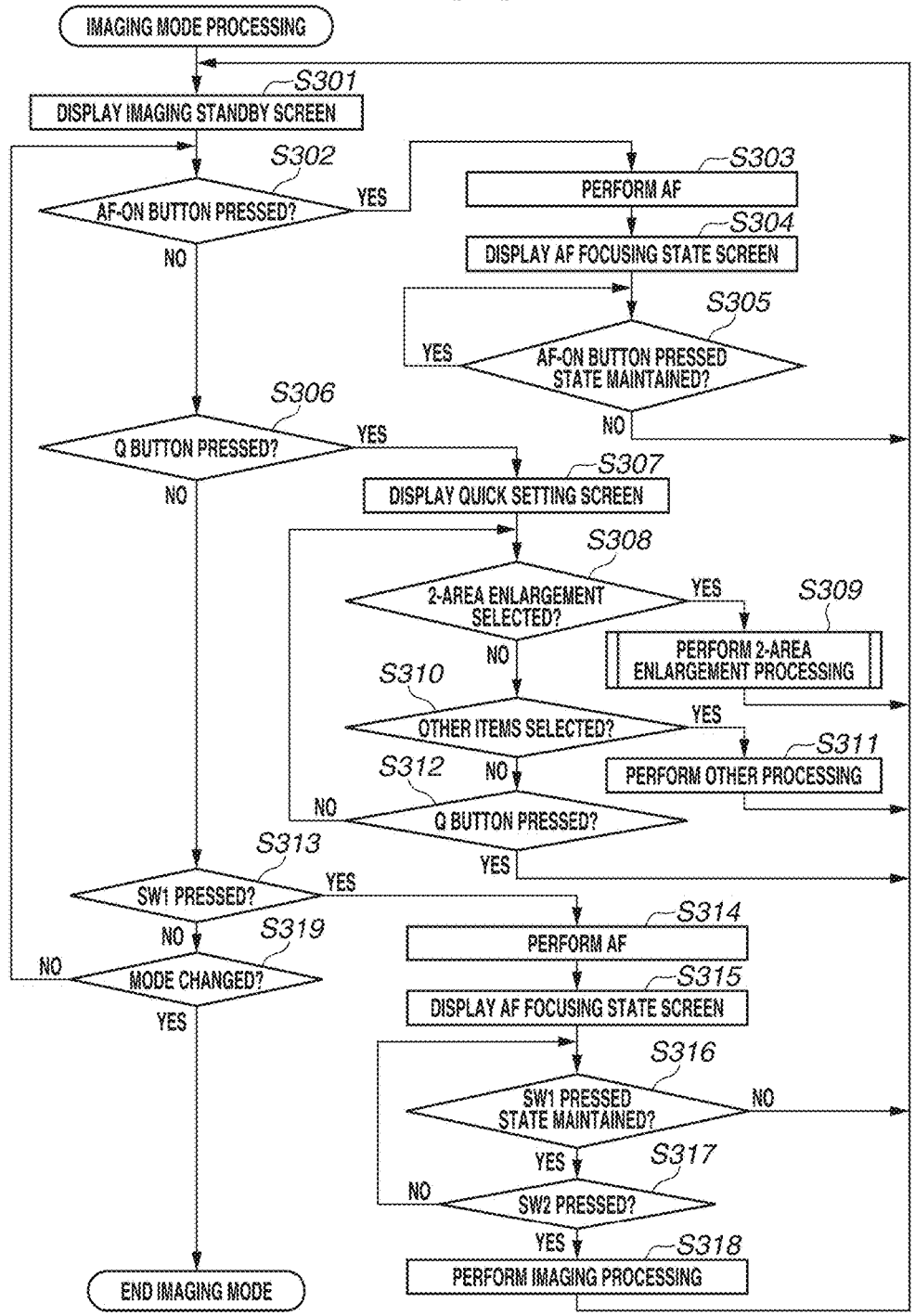

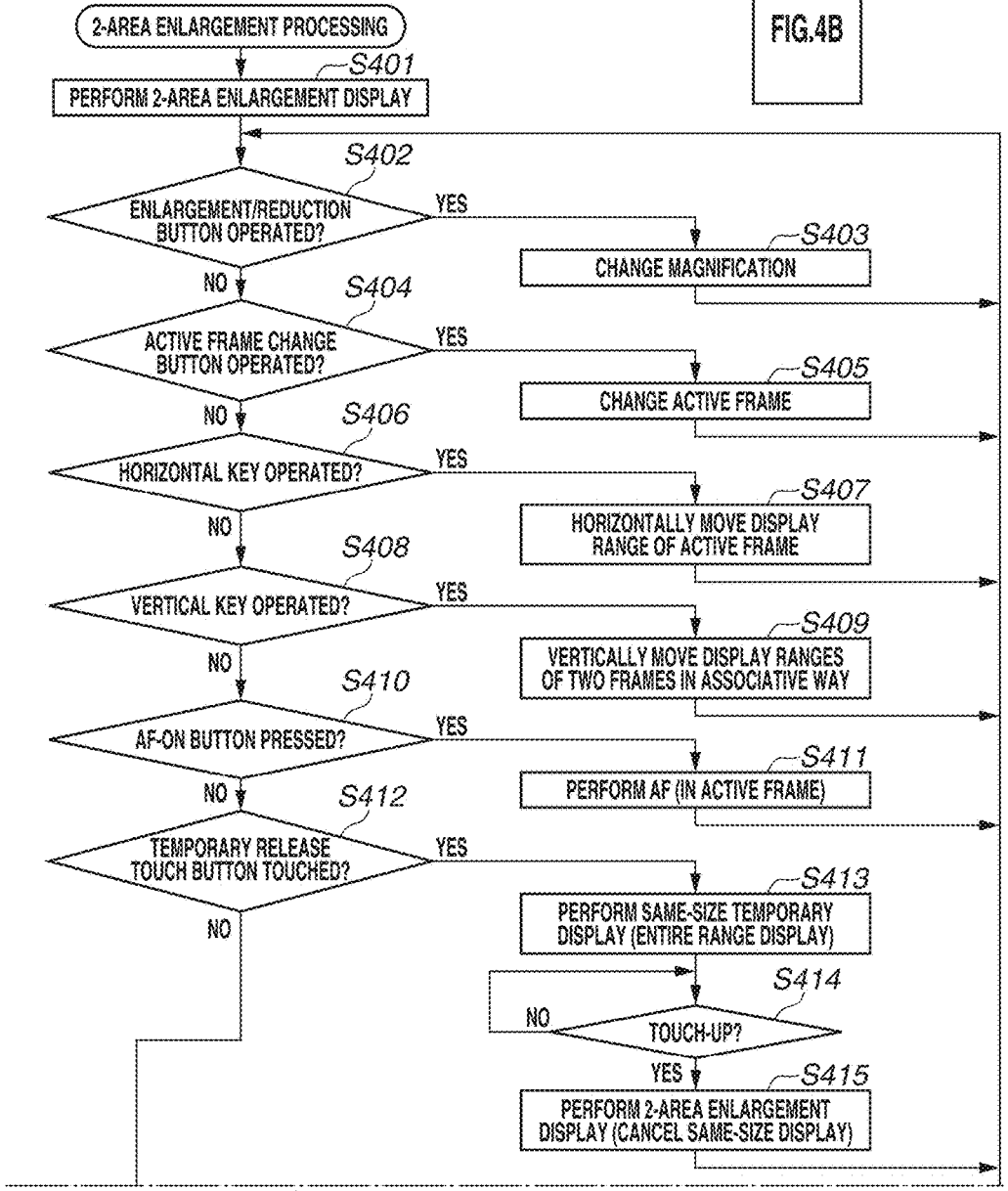

IMAGING CONTROL APPARATUS AND METHOD FOR CONTROLLING THE SAME

BACKGROUND OF THE INVENTION

Field of the Invention

The present disclosure relates to a technique for enlarging display of a part of a live view image.

Description of the Related Art

When using a camera, it is desirable to image a subject while horizontally holding the camera in some cases. For example, if the camera is not horizontally held when imaging a subject such as a building or scenery, a captured image is inclined and look awkward as a result. To solve the issue, Japanese Patent Application Laid-Open No. 2012-060567 discusses a technique for detecting the orientation of a camera based on the direction of gravity detected by an acceleration sensor, and displaying the level display indicating the detected camera orientation together with a live view. Japanese Patent Application Laid-Open No. 2016-163104 discusses a technique for displaying, side by side, enlarged images of two different areas horizontally separated from each other on the live view image, making it possible to visually perform horizontal adjustment with good accuracy.

The technique discussed in Japanese Patent Application Laid-Open No. 2016-163104 makes it possible to accurately perform horizontal adjustment even in a visual way, but does not make it possible to confirm the entire composition with the live view image in a state where parts of the live view image are enlarged. It would be desirable to, during or after horizontal adjustment with two different areas enlarged, confirm the entire live view image with good operability to confirm the composition and determine the shutter timing. However, this point is not taken into consideration by the technique discussed in Japanese Patent Application Laid-Open No. 2016-163104.

SUMMARY OF THE INVENTION

The present disclosure is directed to providing an imaging control apparatus and an imaging control method for switching between a live view display state where two separate areas are enlarged and a live view display state where the entire imaging area is displayed, with good operability.

According to an aspect of the present disclosure, an imaging control apparatus includes a display control unit configured to perform control to perform 2-area enlargement display for displaying live view images respectively captured in two horizontally or vertically separated imaging areas by an imaging unit, side by side on a display unit, and a control unit configured to perform control, in response to a first operation on a first operation unit in a state of the 2-area enlargement display, to cancel the 2-area enlargement display and display on the display unit an entire live view image captured by the imaging unit, and in response to a second operation on the first operation unit, to resume the 2-area enlargement display.

Further features of the present disclosure will become apparent from the following description of exemplary embodiments with reference to the attached drawings.

BRIEF DESCRIPTION OF THE DRAWINGS

FIG. 3 is a flowchart illustrating shooting mode processing.

FIGS. 4A and 4B (collectively, FIG. 4) are a flowchart illustrating 2-point enlargement processing.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
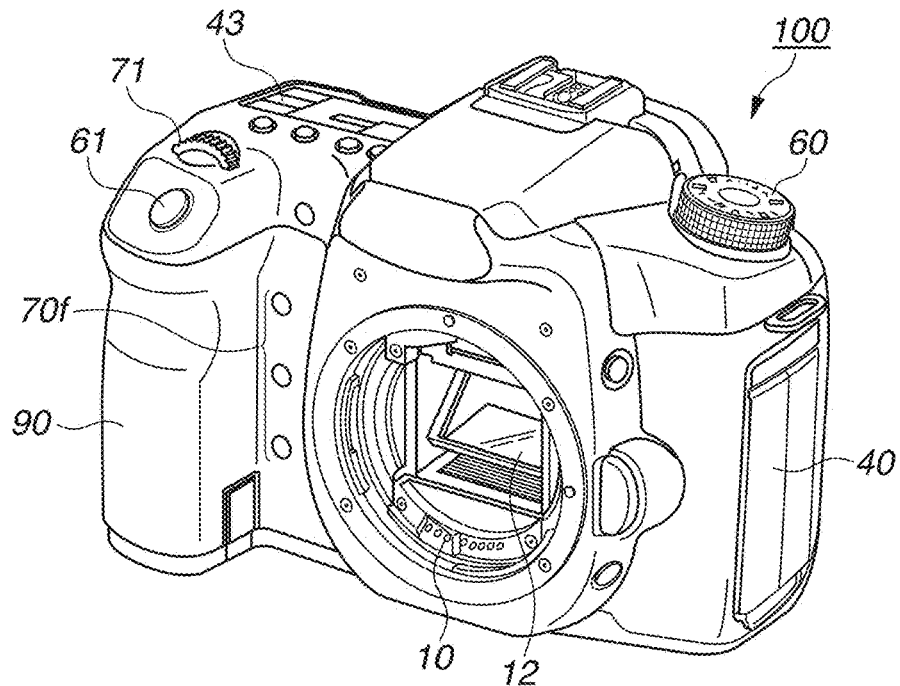
FIGS. 1A and 1B illustrate an outer appearance of a digital camera.
Figure 1B:
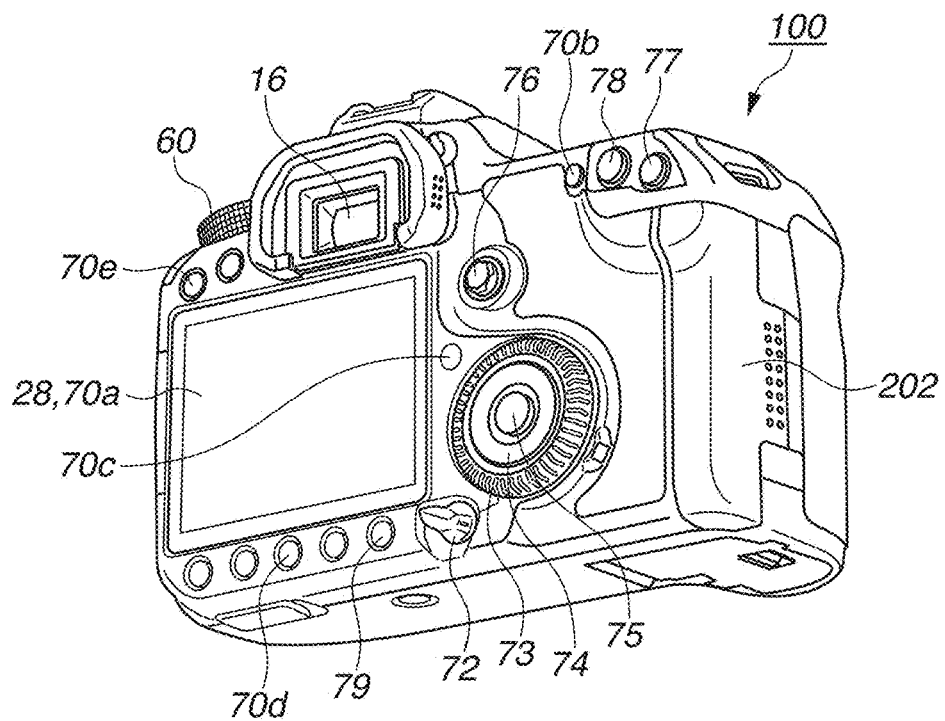

FIGS. 1A and 1B illustrate an outer appearance of a digital camera 100 as an example of an apparatus according to the present disclosure. FIG. 1A is a perspective view illustrating the front panel of the digital camera 100, and FIG. 1B is a perspective view illustrating the rear panel of the digital camera 100. Referring to FIGS. 1A and 1B, a display unit 28 disposed on the rear panel displays an image and various information. An out-finder display unit 43, a display unit disposed on the top face, displays the shutter speed, diaphragm, and other various setting values of the camera 100. A shutter button 61 is an operation portion for issuing a imaging instruction. A mode selection switch 60 is an operation portion for switching between various modes. A terminal cover 40 is a cover for protecting connectors (not illustrated) such as a connection cable for connecting an external apparatus and the digital camera 100. A main electronic dial 71 is a rotary operation member included in an operation unit 70. Turning the main electronic dial 71 enables changing setting values such as the shutter speed and diaphragm. A power switch 72 is an operation member for turning power of the digital camera 100 ON and OFF. A sub electronic dial 73, a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75 included in the operation unit 70 is mainly used to determine a selection item. A live view (LV) button 76 included in the operation unit 70 turns the live view (LV) ON and OFF in the still image imaging mode. In the moving image capturing mode, the LV button 76 is used to instruct the camera 100 to start and stop moving image capturing (recording). An enlargement button 77, an operation button included in the operation unit 70, turns the enlargement mode ON and OFF in live view display in the imaging mode and changes the magnification in the enlargement mode. In the playback image, the enlargement button 77 enlarges the playback image and increases the magnification. A reduction button 78 included in the operation unit 70 reduces the magnification of the enlarged playback image to reduce the displayed image. A playback button 79 included in the operation unit 70 switches between the imaging mode and the playback mode. When a user presses the playback button 79 in the imaging mode, the camera 100 enters the playback mode, and the latest image of images recorded in a recording medium 200 is displayed on the display unit 28. A quick return mirror 12 is moved up and down by an actuator (not illustrated) under the direction of a system control unit 50. A communication terminal 10 is used by the digital camera 100 to communicate with the detachably attached lens. An eyepiece finder 16 is a look-in type finder for confirming the focus and composition of an optical image of a subject obtained through a lens unit 150 by observing a focusing screen 13. A cover 202 is a cover of a slot storing the recording medium 200. A grip portion is a holding portion having a shape which is easy to grasp with the right hand, when the user holds the digital camera 100.

Figure 2:
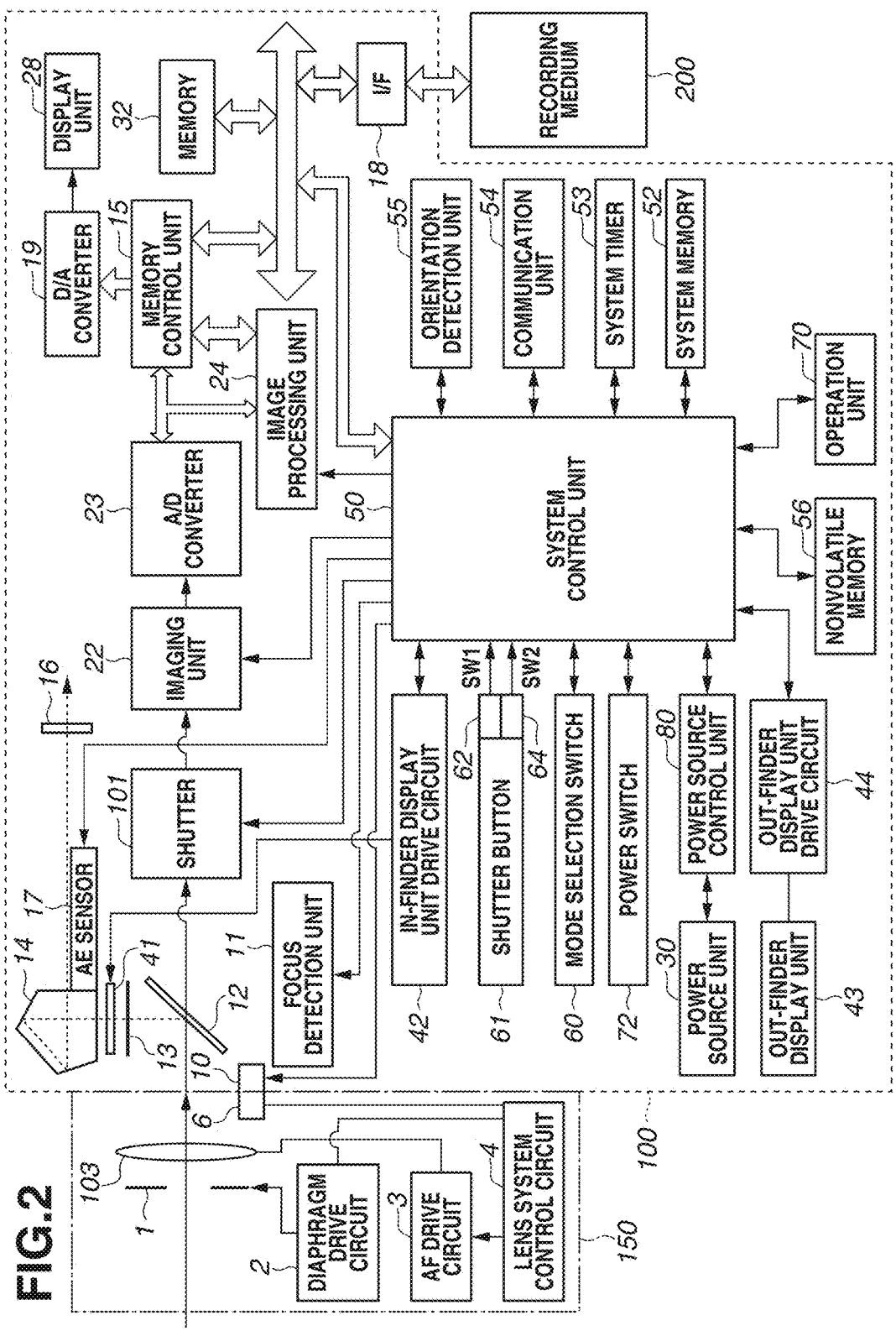
FIG. 2 is a block diagram illustrating a configuration of the digital camera.

FIG. 2 is a block diagram illustrating an example of a configuration of the digital camera 100 according to the present exemplary embodiment.

Referring to FIG. 2, the lens unit 150 mounts an exchangeable imaging lens.

Although the lens 103 includes a plurality of lenses, FIG. 2 illustrates only one lens for simplification. A communication terminal 6 is used by the lens unit 150 to communicate with the digital camera 100. The communication terminal 10 is used by the digital camera 100 to communicate with the lens unit 150. The lens unit 150 communicates with the system control unit 50 via the communication terminals 6 and 10. In the lens unit 150, a lens system control circuit 4 controls a diaphragm 1 via a diaphragm drive circuit 2 and changes the position of the lens 103 via an AF drive circuit 3 to focus on the subject.

An auto exposure (AE) sensor 17 measures the luminance of the subject through the lens unit 150.

A focus detection unit 11 outputs defocus amount information to the system control unit 50. The system control unit 50 controls the lens unit 150 based on the information to perform phase difference autofocus (AF).

When performing exposure, live view imaging, and moving image capturing, the quick return mirror 12 (hereinafter referred to as a mirror 12) is moved up and down by the actuator (not illustrated) under the direction of the system control unit 50. The mirror 12 switches the destination of the incident light flux from the lens 103 between the finder 16 and an imaging unit 22. In the normal state, the mirror 12 is usually disposed to reflect the light flux to guide it to the finder 16. In the imaging and live view display states, the mirror 12 pops up to guide the light flux to the imaging unit 22 and retreats from the light flux (mirror up). The center portion of the mirror 12 is configured as a half mirror to transmit a part of light so that a part of the light flux is incident to the focus detection unit 11 for performing focus detection.

A photographer can confirm the focus and composition of an optical image of a subject obtained through the lens unit 150 by observing the focusing screen 13 via a pentaprism 14 and the finder 16.

A shutter 101 is a focal plane shutter capable of freely controlling the exposure time of the imaging unit 22 under the control of the system control unit 50.

The imaging unit 22 is an image sensor including a charge coupled device (CCD) sensor or a complementary metal oxide semiconductor (CMOS) sensor for converting an optical image into an electric signal. An analog-to-digital (A/D) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the A/D converter 23 or data from a memory control unit 15. The image processing unit 24 performs predetermined calculation processing by using captured image data. The system control unit 50 performs exposure control and ranging control based on an obtained calculation result. This enables performing the AF processing, AE processing, and pre-flash (EF) processing based on the Through the Lens (TTL) method. The image processing unit 24 further performs predetermined calculation processing by using captured image data, and performs TTL-based automatic white balance (AWB) processing based on the obtained calculation result.

The output data from the A/D converter 23 is directly written in the memory 32 via the image processing unit 24 and the memory control unit 15, or via the memory control unit 15. The memory 32 stores image data captured by the imaging unit 22 and converted into digital data by the A/D converter 23, and stores image data to be displayed on the display unit 28. The memory 32 is provided with a sufficient storage capacity for storing a predetermined number of still images and moving images and sound for a predetermined time.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed on the display unit 28 via the D/A converter 19. The display unit 28 displays an image corresponding to the analog signal from the D/A converter 19 on a display such as a liquid crystal display (LCD). The digital signal generated through A/D conversion by the A/D converter 23 and stored in the memory 32 is converted into an analog signal by the D/A converter 19 and successively transmitted to the display unit 28. The display unit 28 displays an image based on the analog signal, functioning as an electronic view finder capable of live view display.

A frame (AF frame) indicating the focusing point at which autofocus is currently being performed and icons indicating the setting conditions of the camera 100 are displayed on an in-finder LCD unit 41 via an in-finder display unit drive circuit 42.

The shutter speed, diaphragm, and other various setting values of the cameras 100 are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operations of the system control unit 50 are stored in the nonvolatile memory 56. Programs stored in the nonvolatile memory 56 refer to programs for executing various flowcharts (described below) according to the present exemplary embodiment.

The system control unit 50 having at least one processor controls the entire digital camera 100. Each piece of processing according to the present exemplary embodiment (described below) is implemented when the system control unit 50 executes the above-described programs recorded in the nonvolatile memory 56. A system memory 52 is a random access memory (RAM). The constants and variables for operations of the system control unit 50 and the programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various control and time of a built-in clock.

The mode selection switch 60, a first shutter switch 62, a second shutter switch 64, and the operation unit 70 are operation portions for inputting various operation instructions to the system control unit 50.

The mode selection switch 60 switches the operation mode of the system control unit 50 between the still image recording mode, the moving image capturing mode, and the playback mode. Modes included in the still image recording mode include the auto imaging mode, auto scene determination mode, manual mode, diaphragm priority mode (Av mode), and shutter speed priority mode (Tv mode). The digital camera 100 is provided with various scene modes as imaging settings for each imaging scene, the programmed AE mode, and the custom mode. The mode selection switch 60 allows the user to directly select one of these modes. Alternatively, after selecting the imaging mode list screen by using the mode selection switch 60, the user may select either one of a plurality of displayed modes by using other operation member. Likewise, a plurality of modes may also be included in the moving image capturing mode.

The first shutter switch 62 turns ON in the middle of an operation (half-depression) of the imaging operation member provided on the digital camera 100, i.e., the shutter button 61, to generate a first shutter switch signal SW1. The half-depression refers to a first operation, i.e., an imaging preparation instruction. The first shutter switch signal SW1 causes the system control unit 50 to start operations for imaging preparation processing including the AF processing, AE processing, AWB processing, and EF processing.

A second shutter switch 64 turns ON upon completion of an operation (full-depression) of the shutter button 61 to generate a second shutter switch signal SW2. The full-depression refers to a second operation, i.e., an imaging instruction operation. The second shutter switch signal SW2 causes the system control unit 50 to start a series of operations in the imaging processing from signal reading from the imaging unit 22 to image data writing in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image advancing button, jump button, narrowing-down button, and attribute change button. For example, when a menu button 70e is pressed, the menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as an input unit for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a four-way button of which the upper, lower, right, and left portions can be pressed in. Although, in the present exemplary embodiment, the cross key 74 is described as an integrally formed operation portion, the cross key 74 may be provided as four independent buttons (upper, lower, right, and left buttons). Hereinafter, the top and button keys are collectively referred to as a top/bottom key, and the right and left keys are collectively referred to as a right/left key. The operation unit 70 also includes the following operation portions.

An AF-ON button 70b is a push-in button switch included in the operation unit 70. Pressing this button issues an instruction for executing AF. The depressing direction of the AF-ON button 70b is parallel to the direction (optical axis) of subject light incident to the imaging unit 22 from the lens 103.

A quick setting key 70c (hereinafter referred to as a Q button 70c) is a push-in button switch included in the operation unit 70. Pressing this key displays a quick setting menu as a list of setting items settable in each operation mode. For example, the Q button 70c is pressed during the imaging standby state in live view imaging, a list of setting items including the electronic leading blade shutter, monitor brightness, LV screen WB, 2-area enlargement, and silent imaging is superimposed on the LV in one row. When the user selects a desired option in the displayed quick setting menu by using the top/bottom key and then press a SET button, the user can shift to the setting change and operation mode related to the selected setting item.

An active frame change button 70d is a push-in button switch included in the operation unit 70. Pressing this button in the 2-area enlargement processing (described below) selects the active enlarged position (frame) out of the two enlarged positions. This button is assigned different functions depending on the operation modes. Pressing this button in the playback mode gives a protection attribute to the displayed image.

The menu button 70e is a push-in button switch included in the operation unit 70. Pressing this button displays on the display unit 28 the menu screen in which various settings are possible.

Function buttons 70f are three push-button switches included in the operation unit 70. The function buttons 70f are assigned different functions. The function buttons 70f are disposed at positions which can be operated with the middle finger, third finger, and little finger of the right hand holding the grip portion 90. The depressing direction is parallel to the direction (optical axis) of the subject light incident to the imaging unit 22 from the lens 103.

A power source control unit 80 includes a battery detection circuit, a direct-current to direct-current (DC-DC) converter, and a switch circuit for selecting a block to be supplied with power. The power source control unit detects the presence or absence of a battery, the battery type, and the remaining battery capacity. The power source control unit 80 also controls the DC-DC converter based on the result of the detection and an instruction of the system control unit 50 to supply required voltages to the recording medium 200 and other components for required time periods.

A power source unit 30 includes a primary battery (such as an alkaline battery and a lithium battery), a secondary battery (such as a NiCd battery, NiMH battery, and Li battery), and an alternating current (AC) adaptor. A recording medium interface (I/F) 18 is an interface to the recording medium 200 such as a memory card and hard disk. The recording medium 200 is such a recording medium as a memory card for recording captured images, including a semiconductor memory and magnetic disk.

A communication unit 54 wirelessly or wiredly establishes connection to perform transmission and reception of an image signal and an audio signal. The communication unit 54 can also connect with a wireless Local Area Network (LAN) and the Internet. The communication unit 54 can transmit images (including a live view image) captured by the imaging unit 22 and images recorded in the recording medium 200, and receive image data and other various information from an external apparatus.

An orientation detection unit 55 detects the orientation of the digital camera 100 in the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or a gyroscope sensor can be used as the orientation detection unit 55.

As one component of the operation unit 70, the digital camera 100 is provided with the touch panel 70a that is capable of detecting a contact on the display unit 28. The touch panel 70a and the display unit 28 can be integrally formed. For example, the touch panel 70a is configured so that the transmittance of light does not disturb the display of the display unit 28, and is attached to the upper layer of the display surface of the display unit 28. Then, the input coordinates on the touch panel 79a are associated with the display coordinates on the display unit 28. This enables configuring such a graphical user interface (GUI) that allows the user to have a feeling of directly operating the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen from the touch panel 70a to end touching (hereinafter referred to as a "touch-up")

A state where the finger or pen is not in contact with the touch panel 70a (hereinafter referred to as a "touch-off")

When a touch-down is detected, a touch-on is detected at the same time. After a touch-down is detected, a touch-on is normally kept being detected until a touch-up is detected. A touch-move is also detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of a touch operation has been performed on the touch panel 70a. As for a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation has been performed. An operation to quickly move the finger over a certain distance while in contact with the touch panel 70a and then release the finger is referred to as a flick. In other words, a flick is an operation by the finger quickly touching and moving, like a quick swiping motion, on the surface of the touch panel 70a. When a touch-move at a predetermined speed or higher over a predetermined distance or longer is detected and then a touch-up is subsequently detected, it can be determined that a flick has been performed (a flick has been performed following a slide operation). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of various types including resistance film type, capacitance type, surface acoustic wave type, infrared-ray type, electromagnetic induction type, image recognition type, and optical sensor type. Although a touch is detected when the finger or pen comes in contact with the touch panel 70a or when the finger or pen comes close to the touch panel 70a depending on the type, either type is applicable.

FIG. 3 is a flowchart illustrating processing during the imaging standby state of the digital camera 100. This processing is implemented when the system control unit 50 loads a program recorded in the nonvolatile memory 56 into the system memory 52 and then executes the program. When the digital camera 100 is activated in the imaging mode and then the live view imaging is turned ON, the digital camera 100 starts the processing illustrated in FIG. 3.

Figure 5A:
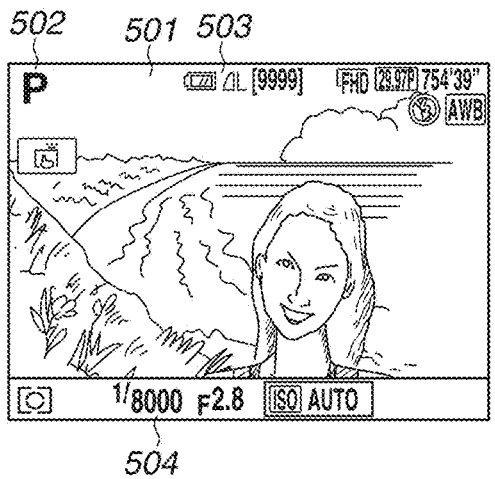
FIGS. 5A to 5E illustrate display examples in the shooting mode processing.

In step S301, the system control unit 50 displays an imaging standby screen on the display unit 28. FIG. 5A illustrates an example of the imaging standby screen. The imaging standby screen displays a live view image 501 (LV image 501) indicating the entire imaging range. An icon 502 indicating the current imaging mode and information display 503 related to imaging settings are superimposed on the LV image 501.

Figure 5D:
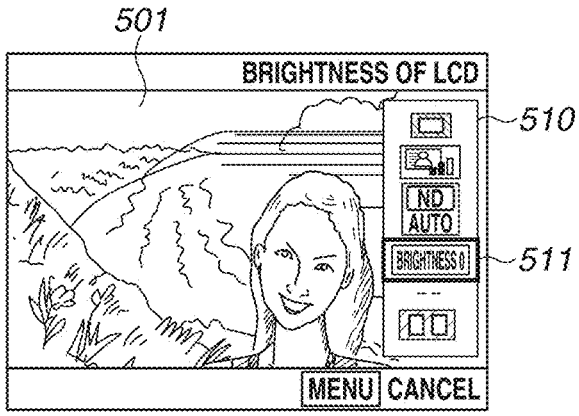
Figure 5B:
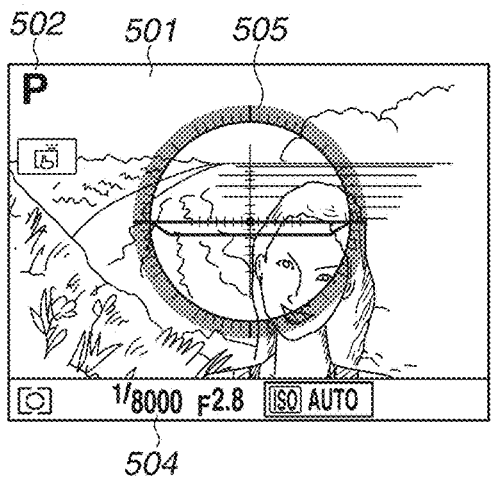

FIG. 5B illustrates another example of the imaging standby screen displaying other information. It becomes possible to simply adjust the level of the camera 100 by superimposing a level 505 on the live view image 501. The level 505 is an electronic level indicating the orientation of the digital camera 100 with respect to the gravity direction detected by the orientation detection unit 55. The level 505 indicates the inclination of the digital camera 100 in the lateral direction (lateral direction of the imaging unit 22) with respect to the direction (horizontal direction) perpendicular to the gravity direction. A level image can be obtained by adjusting the orientation of the digital camera 100 so that the inclination becomes zero while monitoring the level 505. The level 505 further indicates the inclination of the optical axis of the digital camera 100 (direction of the subject light incident to the imaging unit 22) with respect to the direction (horizontal direction) perpendicular to the gravity direction, i.e., the elevation angle or depression angle. The display state illustrated in FIG. 5A and the display state illustrated in FIG. 5B can be switched by depression of the information selection button (INFO button) included in the operation unit 70. It is also possible to, by depression of the information selection button, select a display state where the live view image 501 is displayed, and the icon 502, the information display 503 related to the imaging setting, and information 504 related to exposure are not displayed.

Figure 5E:
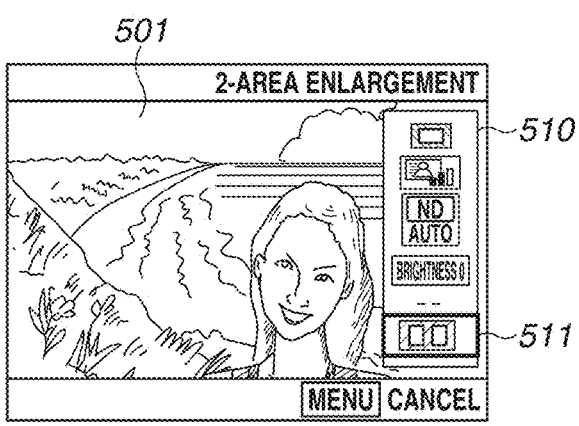
Figure 5C:
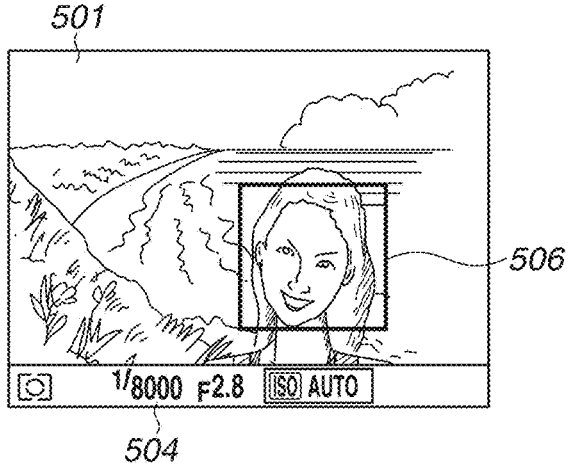

In step S302, the system control unit 50 determines whether the AF-ON button 70b is pressed. When the AF-ON button 70b is pressed (YES in step S302), the processing proceeds to step S303. On the other hand, when the AF-ON button 70b is not pressed (NO in step S302), the processing proceeds to step S306. In step S303, the system control unit 50 performs AF. In step S304, the system control unit 50 displays the screen in the AF focusing state. An example screen in the AF focusing state is illustrated in FIG. 5C. At the in-focus subject portion, a frame 506 indicating the focusing state is superimposed on the live view image 501. If the focusing state cannot be obtained as a result of AF, the system control unit 50 displays a focusing failure indication.

In step S305, the system control unit 50 determines whether the pressed state of the AF-ON button 70b is maintained. When the pressed state of the AF-ON button 70b is maintained (YES in step S305), the system control unit 50 continues displaying the AF focusing state screen. On the other hand, when the AF-ON button 70b is released (NO in step S305), the system control unit 50 cancels the AF focusing state screen, and displays the imaging standby screen again.

In step S306, the system control unit 50 determines whether the Q button 70c is pressed. When the Q button 70c is pressed (YES in step S306), the processing proceeds to step S307. On the other hand, when the Q button 70c is not pressed (NO in step S306), the processing proceeds to step S313. In step S307, the system control unit 50 displays a quick setting menu on the display unit 28. FIG. 5D illustrates an example screen of the quick setting menu. A quick setting menu 510 is superimposed on the live view image 501. The quick setting menu 510 displays an icon group indicating different items. A cursor 511 is displayed on a selected icon. The cursor 511 can be moved by a vertical movement operation with the cross key 74.

Figure 4B:
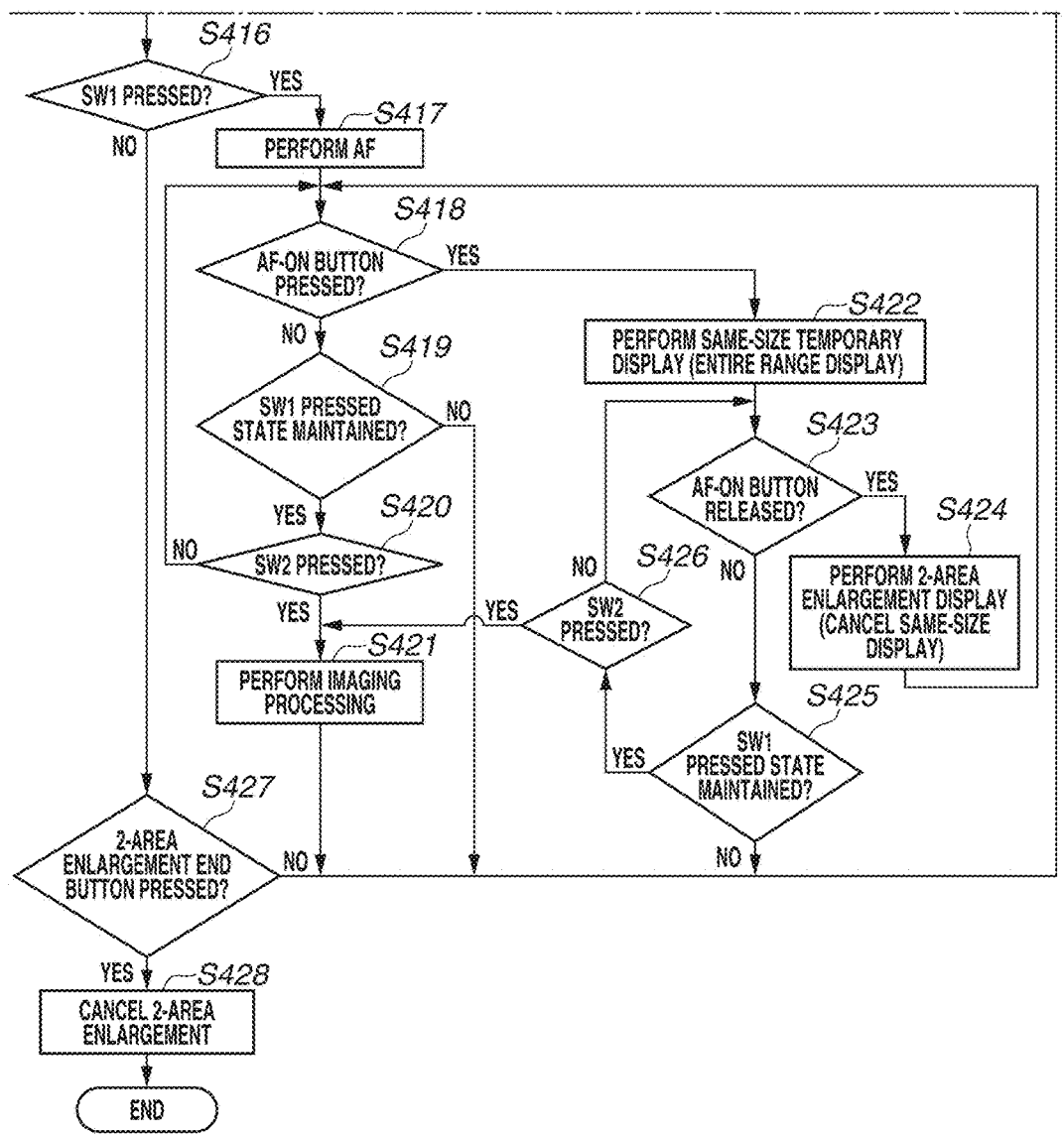

In step S308, the system control unit 50 determines whether the SET button 75 is pressed in a state (illustrated in FIG. 5E) where the cursor 511 is positioned at an icon indicating a 2-area enlargement item out of a plurality of items displayed in the quick setting menu 510. More specifically, the system control unit 50 determines whether a 2-area enlargement item is selected. When the system control unit 50 determines that a 2-area enlargement item is selected (YES in step S308), the processing proceeds to step S309. On the other hand, when the system control unit 50 determines that a 2-area enlargement item is not selected (NO in step S308), the processing proceeds to step S310. In step S309, the system control unit 50 performs the 2-area enlargement processing. The 2-area enlargement processing will be described below with reference to FIGS. 4A and 4B (collectively, FIG. 4).

In step S310, the system control unit 50 determines whether an item other than the 2-area enlargement processing is selected. When the system control unit 50 determines that an item other than the 2-area enlargement processing is selected (YES in step S310), the processing proceeds to step S311. On the other hand, when the system control unit 50 determines that an item other than the 2-area enlargement processing is not selected (NO in step S310), the processing proceeds to step S312. In step S311, the system control unit 50 performs processing according to a selected item other than the 2-area enlargement processing. For example, when an item of brightness adjustment for the LCD (display unit 28) is selected, the system control unit 50 displays a screen of brightness adjustment for the LCD is displayed on the display unit 28, and adjusts the brightness of the display unit 28 in response to a user operation.

In step S312, the system control unit 50 determines whether the Q button 70c is pressed. When the Q button 70c is pressed (YES in step S312), the system control unit 50 ends the display of the quick setting menu. On the other hand, when the Q button 70c is not pressed (NO in step S312), the processing returns to step S308. Then, the system control unit 50 repeats the subsequent processing.

In step S313, the system control unit 50 determines whether the shutter button 61 is half-pressed and SW1 is set to ON. When SW1 is set to ON (YES in step S313), the processing proceeds to step S314. On the other hand, when SW1 is not set to ON (NO in step S313), the processing proceeds to step S319. In step S314, the system control unit 50 performs AF. In addition to AF, the system control unit 50 also performs other imaging preparation processing such as automatic exposure (AE) according to the setting. In step S315, when the focusing state is obtained as a result of AF, the system control unit 50 displays the screen of the AF focusing state. In step S316, the system control unit 50 determines whether the pressed state of the first shutter switch (ON state of SW1) is maintained. When the ON state of SW1 is maintained (YES in step S316), the processing proceeds to step S317. On the other hand, when the ON state of SW1 is not maintained, i.e., the half-press state of the shutter button 61 is canceled (NO in step S316), the system control unit 50 cancels the AF focusing state. Then, the processing returns to step S301. In step S317, the system control unit 50 determines whether the shutter button 61 is fully pressed and SW2 is set to ON. When SW2 is set to ON (YES in step S317), the processing proceeds to step S318. On the other hand, when SW2 is not set to ON (NO in step S317), the processing returns to step S316. In step S318, according to the ON state of SW2, the system control unit 50 performs the above-described imaging processing (a series of operations in the imaging processing from signal reading from the imaging unit 22 to image file writing in the recording medium 200). When the quick review is set to ON, the system control unit 50 automatically displays an image that has just been captured after the imaging processing on the display unit 28 for a predetermined period, allowing the user to confirm the imaging. Upon completion of the imaging processing, the processing returns to step S301.

In step S319, the system control unit 50 determines whether a mode change event has occurred. When a mode change event has occurred (YES in step S319), the system control unit 50 ends the imaging mode processing. On the other hand, when a mode change event has not occurred (NO in step S319), the processing returns to step S302. Then, the system control unit 50 repeats the subsequent processing. Mode change events include power OFF, an end of the live view mode (selection of the optical finder imaging mode), and selection of the playback mode.

FIG. 4 is a flowchart illustrating details of the above-described 2-area enlargement processing in step S309. This processing is implemented when the system control unit 50 loads a program recorded in the nonvolatile memory 56 into the system memory 52 and then executes the program.

Figure 6A:
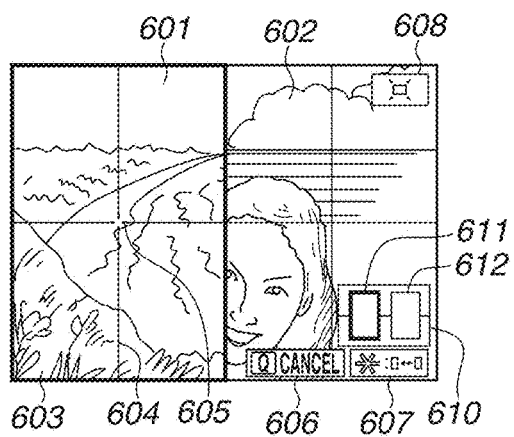
FIGS. 6A to 6G illustrate display examples in the 2-point enlargement processing.

In step S401, the system control unit 50 performs 2-area enlargement display on the display unit 28. An example of a 2-area enlargement display screen is illustrated in FIG. 6A. In the 2-area enlargement display, the system control unit 50 displays side by side the live view images of two areas separated from each other in the lateral direction (horizontal direction) or in the up and down direction (vertical direction). FIG. 6A illustrates an example of the live view images of two areas separated from each other in the horizontal direction displayed side by side on one screen. A left side area 601 is a display area for displaying the live view image currently being captured in a part of the left side area of the imaging unit 22. A right side area 602 is a display area for displaying the live view image currently being captured in a part of the right side area of the imaging unit 22. The live view images displayed in the left side area 601 and the right side area 602 have the same height in the imaging unit 22. An active frame 603 is a selection frame indicating the current operation target area (active area) out of the left side area 601 and the right side area 602. Referring to FIG. 6A, the active frame 603 is displayed on the left side area 601, indicating that the left side area 601 is the current target of right and left movements and AF. Auxiliary lines 604 are displayed at the horizontal and vertical centers of the left side area 601. The intersection of the auxiliary lines 604 is the center of the left side area 601. Likewise, auxiliary lines are displayed at the horizontal and vertical centers of the right side area 602. A center marker 605, a marker displayed on the active frame side, indicates the center of the left side area 601 as an active frame. The auxiliary lines 604 and the center marker 605 are not displayed at the center of the active frame to allow the user to confirm the subject positioned at the center. A guide 606 is a guidance display indicating an operation member (operation method) for canceling the 2-area enlargement display. A guide 607 is a guidance display indicating an operation member (operation method) for switching the active frame. A temporary release touch button 608 is a display item for temporarily canceling the 2-area enlargement state. When the temporary release touch button 608 is touched, the 2-area enlargement display is canceled and the live view image for the entire imaging range is displayed while the touch is maintained. An enlarged position guide 610 indicates the portions currently enlarged as the left side area 601 and the right side area 602 in the entire imaging range (the entire live view image captured by the imaging unit 22 or the entire imaging range reflected in a still image captured according to an imaging instruction). In other words, the enlarged position guide 610 indicates the positions and sizes of the two imaging areas respectively corresponding to the left side area 601 and the right side area 602 relative to the entire imaging range. A left side indicator 611 indicates the range of the live view image displayed in the left side area 601 relative to the entire imaging range. The right side indicator 612 indicates the range of the live view image displayed in the right side area 602 relative to the entire imaging range. To indicate that the active frame 603 is displayed in the left side area 601, the left side indicator 611 is displayed with a different color or thickness from the right side indicator 612. The guides 606 and 607 and the enlarged position guide 610 are superimposed on the live view image of the area without the active frame 603 (non-active frame) so that these guides do not disturb the visual recognition of the live view image of the area with the active frame 603. Meanwhile, regardless of the position of the active frame 603, the temporary release touch button 608 is displayed near the upper right corner of the display unit 28, as illustrated in FIG. 6A, so as to be touched by the thumb of the right hand holding the grip portion 90.

In step S402, the system control unit 50 determines whether either the enlargement button 77 or the reduction button 78 is pressed (enlargement/reduction instruction). When either the enlargement button 77 or the reduction button 78 is pressed (YES in step S402), the processing proceeds to step S403. On the other hand, when neither the enlargement button 77 nor the reduction button 78 is pressed (NO in step S402), the processing proceeds to step S404.

Figure 6C:
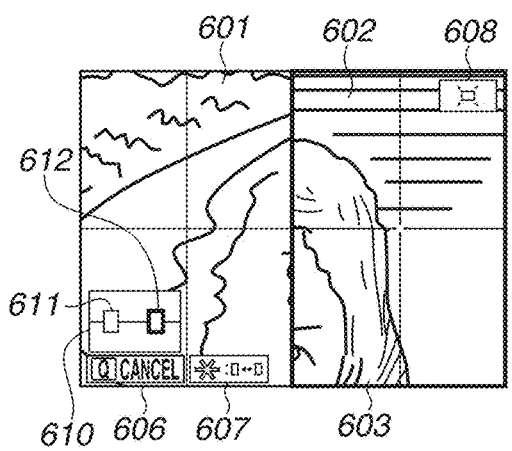
Figure 6B:
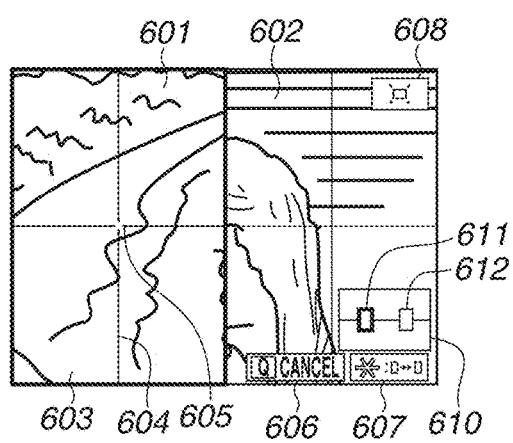

In step S403, the system control unit 50 changes the magnifications of the LV images displayed with 2-area enlargement by an operation. When the enlargement button is pressed, the system control unit 50 increases the respective magnifications of the LV images displayed in the left side area 601 and the right side area 602 and makes the magnifications identical (enlarges the LV images displayed in the left side area 601 and the right side area 602 in an associative way). When the reduction button 78 is pressed, the system control unit 50 decreases the respective magnifications of the LV images displayed in the left side area 601 and the right side area 602 and makes the magnifications identical. The system control unit 50 records the changed magnifications in the system memory 52. Even after the 2-area enlargement display is once canceled, when the 2-area enlargement display is performed again without turning power OFF, the system control unit 50 displays the two LV images with the same magnifications. FIG. 6B illustrates an example screen when the LV images are enlarged by pressing the enlargement button 77 in the state illustrated in FIG. 6A. The live view images displayed in the left side area 601 and the right side area 602 illustrated in FIG. 6B are larger than the respective live view images illustrated in FIG. 6A. The display ranges relative to the entire imaging range decreases according to the degree of enlargement. Therefore, the left side indicator 611 and the right side indicator 612 displayed in the enlarged position guide 610 illustrated in FIG. 6B are smaller than respective indicators illustrated in FIG. 6A.

In step S404, the system control unit 50 determines whether the active frame change button 70d is pressed. When the active frame change button 70d is pressed (YES in step S404), the processing proceeds to step S405. On the other hand, when the active frame change button 70d is not pressed (NO in step S404), the processing proceeds to step S406.

In step S406, the system control unit 50 moves the active frame 603 from the area where the active frame 603 has been positioned before the operation to the other area. FIG. 6C illustrates an example screen when the active frame change button 70d is pressed in the state illustrated in FIG. 6B and the active frame 603 is moved. The active frame 603 positioned on the left side area 601 as illustrated in FIG. 6B has moved to the right side area 602 as illustrated in FIG. 6C. In addition, the guides 606 and 607 and the enlarged position guide 610 have been moved to a position in the left side area 601 as the non-active frame in a superimposed manner.

In step S406, the system control unit 50 determines whether the right/left key of the cross key 74 is operated. When the right/left key is operated (YES in step S406), the processing proceeds to step S407. On the other hand, when the horizontal key is not operated (NO in step S406), the processing proceeds to step S408.

Figure 6D:
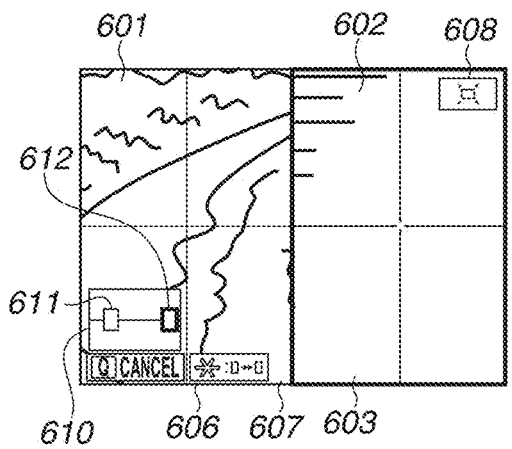

In step S407, in response to operation of the right/left key, the system control unit 50 horizontally moves the display range of the area displayed with the active frame 603. More specifically, when the left key is pressed, the system control unit 50 moves the display range of the area displayed with the active frame 603 towards the left. When the right key is pressed, the system control unit 50 moves the display range of the area displayed with the active frame 603 towards the right. FIG. 6D illustrates an example screen when the right key is pressed several times in the state illustrated in FIG. 6C. Referring to FIG. 6D, the enlargement area displayed with the active frame 603 in the right side area 602 is moved further to the right in the imaging range than in the state illustrated in FIG. 6C (i.e., the image itself scrolls to the left).

At this timing, the display range of the left side area 601 as the non-active frame remains unchanged (when the left side area 601 and the right side area 602 do not adjoin each other, the respective horizontal movements are performed not in an associative way). Referring to the enlarged position guide 610 illustrated in FIG. 6D, the right side indicator 612 is moved further to the right than in the state illustrated in FIG. 6C to indicate that the display range of the right side area 602 has further moved towards the right. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges. In a case where the right end of the display range of the left side area 601 adjoins the left end of the display range of the right side area 602, even if the active frame 603 is on the left side area 601, the system control unit 50 moves both of the display ranges of the left side area 601 and the right side area 602 to the right in an associative way in response to an instruction for further movement to the right. However, when the right side area 602 has reached the right end of the entire imaging range, the display ranges cannot be moved any further to the right, so that the system control unit 50 does not move the display ranges even if an instruction for further movement to the right is issued. On the contrary, in a case where the left end of the display range of the right side area 602 adjoins the right end of the display range of the left side area 601, even if the active frame 603 is on the right side area 602, the system control unit 50 moves both of the display ranges of the left side area 601 and the right side area 602 to the left in response to an instruction for further movement to the left. However, when the left side area 601 has reached the left end of the entire imaging range, the display ranges cannot be moved any further to the left, so that the system control unit 50 does not move the display ranges even if an instruction for further movement to the left is issued.

In step S408, the system control unit 50 determines whether the top/bottom key of the cross key 74 is operated. When the top/bottom key is operated (YES in step S408), the processing proceeds to step S409. On the other hand, when the vertical keys is not operated (NO in step S408), the processing proceeds to step S410.

Figure 6E:
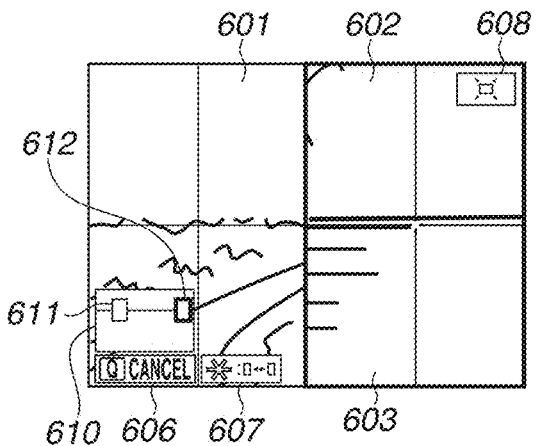

In step S409, in response to the operation of the top/bottom key, the system control unit 50 vertically moves the display ranges of the left side area 601 and the right side area 602 in an associative way. More specifically, when the upper key is pressed, the system control unit 50 moves up the display ranges of the left side area 601 and the right side area 602 in an associative way. When the lower key is pressed, the system control unit 50 moves down the display ranges of the left side area 601 and the right side area 602 in an associative way. FIG. 6E illustrates an example screen when the upper key is pressed several times in the state illustrated in FIG. 6D. Referring to FIG. 6E, the display ranges of the left side area 601 and the right side area 602 are moved further upward in the imaging range than in the state illustrated FIG. 6D (i.e., the image itself scrolls down). Referring to the enlarged position guide 610 illustrated in FIG. 6E, the left side indicator 611 and the right side indicator 612 are moved further upward than in the state illustrated in FIG. 6D to indicate that the display ranges of the left side area 601 and the right side area 602 have moved further upward. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges.

Figure 6F:
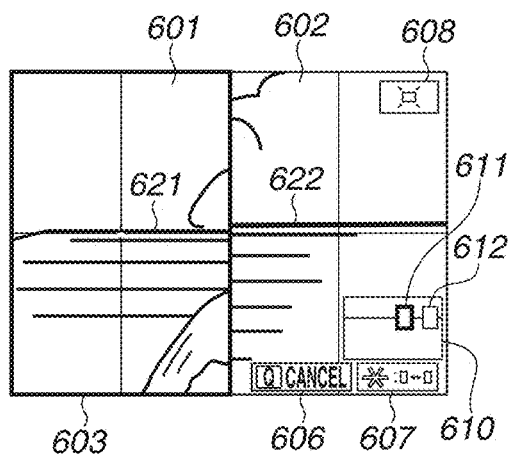

After repeating the above-described operations to set display ranges for the 2-area enlargement display at two separate positions based on the horizon, a horizontal outline of a building, etc., the user can capture a subject image with the line of the subject horizontally reflected by imaging the subject after adjusting the orientation of the camera 100 to align the lines of the subject in the left side area 601 and the right side area 602. FIG. 6F illustrates an example screen at the time of the 2-area enlargement display, in which the left side area 601 is set to a subject portion including a horizontal line 621 and the right side area 602 is set to a subject portion including a horizontal line 622 at a position separate from that of the horizon 621. Although the horizontal lines 621 and 622 are actually a straight line, in the example illustrated in FIG. 6F, the horizon 621 in the left side area 601 and the horizon 622 in the right side area 602 cannot be recognized as one straight line but are slightly mismatched. By monitoring such a display, the user can recognize that the digital camera 100 is not horizontally held. The user can capture an image in which the horizontal line is horizontally reflected by imaging a subject after adjusting the orientation of the digital camera 100 to an orientation with which the horizons 621 and 622 can be visually recognized as one straight line.

In step S410, the system control unit 50 determines whether the AF-ON button 70b is pressed. When the AF-ON button 70b is pressed (YES in step S410), the processing proceeds to step S411. On the other hand, the AF-ON button 70b is not pressed (NO in step S410), the processing proceeds to step S412.

In step S411, the system control unit 50 performs AF on the central part of the active frame 603 (position indicated by the center marker 605). Because of LV imaging, the system control unit 50 performs AF based on contrast AF or imaging plane phase difference AF. This enables the focusing state of the active frame 603 making it easier to recognize edge portions of the subject. Accordingly, it becomes easy to perform such a confirmation operation for matching the line of the subject of the right and left areas.

In step S412, the system control unit 50 determines whether the temporary release touch button 608 is touched, i.e., whether a touch-down is performed on this button. When a touch-down on the temporary release touch button 608 is performed (YES in step S412), the processing proceeds to step S413. On the other hand, when a touch-down on the temporary release touch button 608 is not performed (NO in step S412), the processing proceeds to step S416.

Figure 6G:
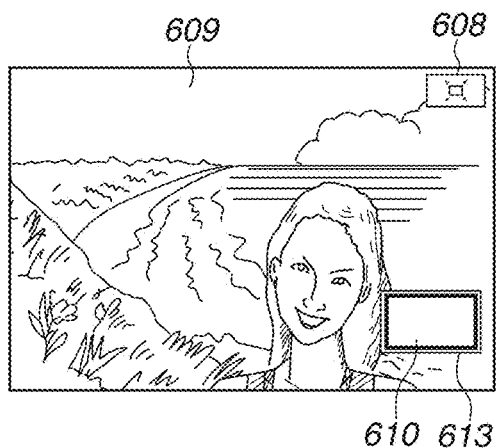

In step S413, the system control unit 50 cancels the 2-area enlargement display and performs the same-size temporary display (displays the entire imaging range captured as a still image in response to an imaging instruction). FIG. 6G illustrates an example screen of the same-size temporary display (normal magnification ratio temporary display). During the same-size temporary display, the live view image is displayed as a same-size entire live view display 609 where the auxiliary lines displayed in 2-area enlargement are hidden. In the enlarged position guide 610, the left side indicator 611 and the right side indicator 612 are hidden, and an indicator 613 indicates that the entire display range is currently displayed. The indicator 613 also indicates that the two imaging areas are not currently displayed. At this timing, the touch (touch-on) state of the temporary release touch button 608 is continued. The temporary release touch button 608 can be touched by the thumb of the right hand holding the camera grip (grip portion 90), making it easier to touch the button, thus reducing vertical camera shake and rotational camera shake. In the same-size temporary display, unlike the normal imaging standby screen, imaging conditions such as the shutter speed and diaphragm values are not displayed.

In step S414, the system control unit 50 determines whether a touch-up is performed. When a touch-up is performed (YES in step S414), the processing proceeds to step S415. On the other hand, when a touch-up is not performed (NO in step S414), the system control unit 50 continues the same-size temporary display. That is, the system control unit 50 displays the same-size temporary display as long as the touch on the temporary release touch button 608 is continued after a touch-down on the button is performed. When the touch is released, the system control unit 50 resumes the previous 2-area enlargement display.

In step S415, the system control unit 50 cancels the same-size temporary display and resumes the previous 2-area enlargement display. The display range and magnification remain the same as those before a touch-down on the temporary release touch button 608 is performed. The user can easily and quickly switch between the 2-area enlargement display and the entire range display to confirm the image by touching the temporary release touch button 608 and releasing the touch.

In step S416, the system control unit 50 determines whether the shutter button 61 is half-pressed and SW1 is set to ON. When SW1 is set to ON (YES in step S416), the processing proceeds to step S417. On the other hand, when SW1 is not set to ON (NO in step S416), the processing proceeds to step S427.

In step S417, the system control unit 50 performs AF on the center portion of the active frame 603 (position indicated by the center marker 605) without canceling the 2-area enlargement display. When the focusing state is obtained as a result of AF, focus is fixed (AF lock) while the ON state of SW1 is maintained.

In step S418, the system control unit 50 determines whether the AF-ON button 70*b* is pressed. Since the AF lock is maintained in step S418, the system control unit 50 does not perform AF even if the AF-ON button 70*b* is pressed. Instead, when the AF-ON button 70*b* is pressed, the system control unit 50 temporarily cancels the 2-area enlargement display and performs the entire range display. When the AF-ON button 70*b* is pressed (YES in step S418), the processing proceeds to step S422. On the other hand, when the AF-ON button 70*b* is not pressed (NO in step S418), the processing proceeds to step S419.

In step S419, the system control unit 50 determines whether the ON state of SW1 is maintained. When the ON state of SW1 is maintained (YES in step S419), the processing proceeds to step S420. On the other hand, when the ON state of SW1 is not maintained (NO in step S419), the system control unit 50 cancels the AF lock state. Then, the processing returns to step S402.

In step S420, the system control unit 50 determines whether the shutter button 61 is fully pressed and SW2 is set to ON. When SW2 is set to ON (YES in step S420), the processing proceeds to step S421. On the other hand, when SW2 is not set to ON (NO in step S420), the processing returns to step S418.

In step S421, the system control unit 50 performs the above-described imaging processing (a series of operations in the imaging processing from signal reading from the imaging unit 22 to image file writing in the recording medium 200). The image to be captured by the imaging processing is not the ranges subjected to the 2-area enlargement display but the image of the imaging range. Upon completion of the imaging processing in step S421, the processing returns to step S402. Alternatively, when the imaging processing is completed, the processing may not return to step S402, and the system control unit 50 may cancel the 2-area enlargement display and return to the live view display (same-size display or normal magnification ratio display) over the entire imaging range, i.e., the processing may proceed to step S301.

In step S422, in response to the depression of the AF-ON button 70*b*, the system control unit 50 cancels the 2-area enlargement display and performs the same-size temporary display (displays the entire imaging range captured as a still image in response to an imaging instruction). The same-size temporary display is similar to that illustrated in FIG. 6G. The same-size temporary display allows the user to determine, after adjusting the level through the 2-area enlargement display and then performing AF, the shutter timing by monitoring the entire imaging range. During the live view imaging described above with reference to FIGS. 4 and 5, the user horizontally adjusts the composition according to the horizontal line in the background through the 2-area enlargement display and then presses the AF-ON button 70*b* to perform the entire range display. Then, the user can confirm the facial expression of the woman. At the timing when the woman smiles, the user presses SW2 to capture an image of the smiling face in a horizontal state.

In step S423, the system control unit 50 determines whether the depression of the AF-ON button 70*b* is released. When the depression of the AF-ON button 70*b* is released (YES in step S423), the processing proceeds to step S424. In step S424, the system control unit 50 cancels the same-size temporary display and resumes the 2-area enlargement display. The display range and magnification remain the same as those before the AF-ON button 70*b* is pressed. On the other hand, when the depression of the AF-ON button 70*b* is not released (NO in step S423), the processing proceeds to step S425. In step S425, the system control unit 50 determines whether the ON state of SW1 is maintained. When the ON state of SW1 is maintained (YES in step S425), the processing proceeds to step S426. On the other hand, when the ON state of SW1 is canceled (NO in step S425), the processing returns to step S402. In step S426, the system control unit 50 determines whether the shutter button 61 is fully pressed and SW2 was set to ON. When SW2 is set to ON (YES in step S426), the processing proceeds to step S421. On the other hand, when SW2 is not set to ON (NO in step S426), the processing returns to step S423.

In step S427, the system control unit 50 determines whether the 2-area enlargement end button is pressed. According to the present exemplary embodiment, the 2-area enlargement end button is the Q button 70*c*. When the Q button 70*c* is pressed (YES in step S427), the processing proceeds to step S428. On the other hand, when the Q button 70*c* is not pressed (NO in step S427), the processing returns to step S402. Then, the system control unit 50 repeats the subsequent processing.

In step S428, the system control unit 50 cancels the 2-area enlargement display, resumes the entire live view image (entire range display), and ends the 2-area enlargement processing. Then, the processing proceeds to step S301 illustrated in FIG. 3. When the 2-area enlargement end button (Q button 70*c*) is pressed, the 2-area enlargement display ends not in a temporary way. Therefore, it is not so easy to resume the 2-area enlargement display as in the case where the 2-area enlargement display is temporarily canceled by touching the above-described temporary release touch button 608 or pressing the AF-ON button 70*b*. To perform the 2-area enlargement display again after the processing proceeds to step S301, the user needs to perform an operation for pressing the Q button 70*c* to display the quick setting menu, moving the cursor to the 2-area enlargement item, and pressing the SET button 75, as described above. The screen configuration for the live view display displaying the entire range differs between a state where the 2-area enlargement display is temporarily cancelled (FIG. 6G) and a state where the 2-area enlargement display is canceled not in a temporary way (FIG. 5A or 5B). The screen illustrated in FIG. 5A or 5B displays the icon 502 indicating the current imaging mode, the information 504 related to the exposure of the camera 100, and other information indicating imaging-related imaging settings. On the other hand, the screen illustrated in FIG. 6G does not include such information. The screen illustrated in FIG. 6G displays the entire live view image together with the indicator 613 indicating that the current display range is the entire imaging range. On the other hand, the screen illustrated in FIG. 5A or 5B does not include such indicator.

According to the above-described present exemplary embodiment, by touching (starting a touch operation on) the temporary release touch button 608 during the 2-area enlargement display, the user can easily and quickly cancel the 2-area enlargement display and change the screen to the entire live view (entire range display). The user can perform the 2-area enlargement display simply by releasing the touch (ending the touch operation). Therefore, the user can switch between the 2-area enlargement display and the entire range display by fewer operations, without performing troublesome operations.

As described above, the 2-area enlargement display is intended to be used to horizontally adjust the orientation of the digital camera 100. However, if the user temporarily cancels and resumes the 2-area enlargement display by operating a physical operation member such as a push button, the level of the orientation of the camera 100 once adjusted may possibly be inclined by the operation force. Therefore, according to the present exemplary embodiment, the user is allowed to temporarily cancel and resume the 2-area enlargement display by performing a touch operation on the temporary release touch button 608 so that the operation can be performed with a smaller force than in operating a physical operation member such as a push button. This makes it possible to prevent the orientation of the digital camera 100 from being easily changed by operations for temporarily canceling and resuming the 2-area enlargement display, compared to the operations with a push button.

Although, according to the present exemplary embodiment, touching the temporary release touch button 608 temporarily cancels the 2-area enlargement display and releasing the touch from the temporary release touch button 608 resumes the entire range display, the 2-area enlargement display may be canceled and resumed by other operations. More specifically, the 2-area enlargement display is temporarily canceled when the user performs a touch-down on the temporary release touch button 608 or performs a tap operation (a touch-down and then a touch-up) on the temporary release touch button 608. The state where the 2-area enlargement display is temporarily canceled is maintained also when the user releases the touch. The 2-area enlargement display may be resumed when the user performs a new touch operation for resuming the 2-area enlargement display, for example, when the user performs a tap operation on a touch button for resuming the 2-area enlargement display displayed in the state where the 2-area enlargement display is temporarily canceled. Although, in the above-described example for temporarily canceling and resuming the 2-area enlargement display through other operations than touch operations, the 2-area enlargement display is temporarily canceled when the AF-ON button 70*b* is pressed, and resumed when the depression is released, the 2-area enlargement display may be canceled and resumed through other depressing operations. More specifically, the 2-area enlargement display is canceled when the user presses a push button for the first time, and the state where the 2-area enlargement display is temporarily canceled is maintained even when the user releases the depression of the push button. Subsequently, the 2-area enlargement display is resumed when the user presses the push button again (for the second time). However, it is desirable that the user can cancel and resume the 2-area enlargement display by operating the same single operation member without using other operation members. Thus, since the 2-area enlargement display is canceled until the display is resumed, the user does not need to move the finger to any other operation members and therefore can perform the cancel and resume operations without looking aside from the display unit 28.

The 2-area enlargement display may be temporarily canceled and resumed through operations other than a touch operation on the temporary release touch button 608 and the depression of the AF-ON button 70*b*. For example, the 2-area enlargement display may be canceled and resumed through operations on buttons, dials, and levers included in the operation unit 70 other than the touch panel 70*a* and the AF-ON button 70*b*. Also in this case, it is desirable to cancel and resume the 2-area enlargement display with operations on the same single operation member, as described above. To prevent the horizontal orientation of the digital camera 100 from being changed by an operation, it is desirable to cancel and resume the 2-area enlargement display through operations in which a force is hardly applied in the direction of rotation around the optical axis of the digital camera 100. As such a button, for example, the 2-area enlargement display may be canceled and resumed by pressing any one of the function buttons 70*f*. Since pressing any one of the function buttons 70*f* applies a force in the direction parallel to the optical axis, and hardly changes the horizontal orientation of the camera 100. The AF-ON button 70*b* is another operation member which can be operated by the depression in which a force is applied in the direction parallel to the optical axis. Conversely, when a force is applied in the direction perpendicular to the optical axis, the orientation of the digital camera 100 may possibly change since the camera 100 rotates around the optical axis. Therefore, for example, the push buttons on the plane where the out-finder display unit 43 is provided are not suitable since these buttons are pressed in the direction perpendicular to the optical axis. Therefore, the functions of canceling and resuming the 2-area enlargement display are not assigned to the push buttons on the plane where the out-finder display unit 43 is provided.

The above-described various control processing to be performed by the system control unit 50 may be performed by one hardware component, and the entire apparatus may be controlled by a plurality of hardware components which share processing.

While the present disclosure has specifically been described based on exemplary embodiments, the present disclosure is not limited thereto but can be modified in diverse ways without departing from the spirit and scope thereof. The above-described exemplary embodiments are to be considered as illustrative and not restrictive of the scope of the present disclosure. These exemplary embodiments can be suitably combined.

Although, in the above-described exemplary embodiments, the present disclosure is applied to the digital camera 100, the present invention is not limited thereto. The present disclosure is also applicable to an imaging control apparatus capable of performing the 2-area enlargement display. More specifically, the present disclosure is applicable to a personal computer and a personal digital assistant (PDA) having a camera function, a mobile phone terminal with a camera, a portable image viewer with a camera, a music player with a camera, a game machine with a camera, an electronic book reader with a camera, and so on. The present disclosure is also applicable to a tablet terminal with a camera, a smart phone with a camera, a household appliance and onboard apparatus having a camera function and a display. The present disclosure is also applicable to a smart phone, a tablet personal computer (PC), a desktop PC, etc. which receive and display a live view image captured by a digital camera, etc. via wired or wireless communication and remotely controls the digital camera (including a network camera).

The above-described 2-area enlargement display is also applicable to a playback image. More specifically, an electronic apparatus, not limited to a camera, is allowed to perform 2-area enlargement display for displaying respective partial images in a first and a second area at horizontally different positions in the entire image, side by side on a display unit. Even in this case, the above-described various operations are applicable.

According to the above-described exemplary embodiment, it is possible to switch between a live view display state where two separate areas are enlarged and a live view display state where the entire imaging area is displayed, with good operability, thus improving operability during imaging.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-254228, filed Dec. 27, 2016, which is hereby incorporated by reference herein in its entirety.

What is claimed is:

1. An imaging control apparatus comprising:
a memory and at least one processor which function as:
a display control unit configured to perform control to perform 2-area enlargement display for displaying live view images respectively captured in two horizontally or vertically separated imaging areas by an imaging unit, side by side on a display unit;
a control unit configured to perform control,
in response to a first operation on a first operation member in a state of the 2-area enlargement display, to cancel the 2-area enlargement display and display on the display unit an entire live view image captured by the imaging unit, and
in response to a second operation on the first operation member, to resume the 2-area enlargement display; and
a selection unit configured to select either one of two display areas side by side on the display unit in the state of the 2-area enlargement display,
wherein, according to a display area currently selected from the two display areas, displaying a guide indicating positions and sizes of the two separated imaging areas in an unselected display area.

2. The imaging control apparatus according to claim 1, wherein the first operation is to start an operation on the first operation member, and the second operation is to end the operation on the first operation member.

3. The imaging control apparatus according to claim 1, wherein the display unit is a touch panel, and the first operation member is the touch panel.

4. The imaging control apparatus according to claim 3, wherein the first operation is an operation for touching the touch panel, and the second operation is an operation for releasing the touch from the touch panel.

5. The imaging control apparatus according to claim 3, wherein the first operation is a touch operation on a specific display item displayed on the display unit during the 2-area enlargement display.

6. The imaging control apparatus according to claim 5, further comprising displaying the specific display item at a specific position on the display unit regardless of which display area is currently selected by the selection unit.

7. The imaging control apparatus according to claim 6, wherein the specific position is a position which can be touched by a finger of a hand holding a grip portion for holding the imaging control apparatus.

8. The imaging control apparatus according to claim 6, wherein the specific position is an upper right corner of the display unit.

9. The imaging control apparatus according to claim 1, wherein the first operation member is a specific push button, wherein the first operation is to depress the specific push button, and wherein the second operation is to release the depression of the specific push button.

10. The imaging control apparatus according to claim 1, wherein the first operation member is a specific push button which is pressed in a direction parallel to an optical axis of subject light captured by the imaging unit.

11. The imaging control apparatus according to claim 1, wherein, in response to an operation on a second operation member in the state of the 2-area enlargement display, the control unit performs control to cancel the 2-area enlargement display and display on the display unit the entire live view image captured by the imaging unit, and wherein, the display control unit performs control, when the 2-area enlargement display is canceled in response to the first operation in the state of the 2-area enlargement display, to display the entire live view image in a first screen configuration, and when the 2-area enlargement display is canceled in response to the operation on the second operation member in the state of the 2-area enlargement display, to display the entire live view image in a second screen configuration different from the first screen configuration.

12. The imaging control apparatus according to claim 1, wherein the display control unit performs control:

to display a first guide indicating positions and sizes of the two imaging areas with respect to an entire imaging range in the 2-area enlargement display;

to display, in the first screen configuration, the entire live view image and a second guide not indicating that the two imaging areas with respect to the entire imaging range; and not to display the second guide in the second screen configuration.

13. The imaging control apparatus according to claim 11, wherein the display control unit performs control:

to display, in the second screen configuration, the entire live view image and predetermined imaging information indicating imaging settings related to imaging by the imaging unit; and not to display the predetermined imaging information in the first screen configuration.

14. The imaging control apparatus according to claim 1, wherein, in response to an operation on a second operation member in the state of the 2-area enlargement display, the control unit performs control to cancel the 2-area enlargement display and display the entire live view image on the display unit, and wherein, when the 2-area enlargement display is canceled in response to the operation on the second operation member in the state of the 2-area enlargement display, the control unit does not perform control to resume the 2-area enlargement display even upon the second operation on the first operation member.

15. The imaging control apparatus according to claim 1, further comprising:

an imaging operation member configured to receive a first and a second operation; and a third operation member, wherein, upon an operation on the third operation member in a state where the imaging operation member is not operated during the 2-area enlargement display, the control unit performs control to perform auto focus, wherein, upon the first operation during the 2-area enlargement display, the control unit performs control to perform auto focus without canceling the 2-area enlargement display, wherein, upon the second operation after the first operation during the 2-area enlargement display, the control unit controls the imaging unit to perform imaging, and wherein, when auto focus is performed in response to the first operation during the 2-area enlargement display and an operation is performed on the third operation member in a state where the first operation is maintained, the control unit performs control to cancel the 2-area enlargement display and display on the display unit the entire live view image captured by the imaging unit.

16. An imaging control apparatus comprising:

an imaging operation member configured to receive a first and a second operation; and a memory and at least one processor which function as:

a display control unit configured to perform control to perform 2-area enlargement display for displaying live view images respectively captured in two horizontally or vertically separated imaging areas, side by side on a display unit, wherein the two horizontally or vertically separated imaging areas are separated along an entire length or an entire height of the display unit; and a control unit configured to perform control, upon the first operation during the 2-area enlargement display, to perform auto focus without canceling the 2-area enlargement display, upon the second operation after the first operation during the 2-area enlargement display, to perform imaging by the imaging unit, and when auto focus is performed in response to the first operation during the 2-area enlargement display and an operation is performed on a specific operation member in a state where the first operation is maintained, to cancel the 2-area enlargement display and display on the display unit the entire live view image captured by the imaging unit.

17. The imaging control apparatus according to claim 16, wherein, upon an operation on the specific operation member in a state where the imaging operation member is not operated during the 2-area enlargement display, the control unit performs auto focus.

18. The imaging control apparatus according to claim 16, wherein, upon the second operation performed when the 2-area enlargement display is cancelled and the entire live view image display is performed on the display unit in response to the operation on the specific operation member in the state where the first operation is maintained, the control unit controls the imaging unit to perform imaging.

19. The imaging control apparatus according to claim 16, wherein, upon a cancellation of the operation on the specific operation member when the 2-area enlargement display is cancelled and the entire live view image display is performed on the display unit in response to an operation on the specific operation member in the state where the first operation is maintained, the control unit performs control to resume the 2-area enlargement display.

20. A method for controlling an imaging control apparatus, the method comprising:

performing display control to perform 2-area enlargement display for displaying live view images respectively captured in two horizontally or vertically separated imaging areas by an imaging unit, side by side on a display unit;

performing control,
in response to a first operation on a first operation member in a state of the 2-area enlargement display, to cancel the 2-area enlargement display and display on the display unit an entire live view image captured by the imaging unit, and
in response to a second operation on the first operation member, to resume the 2-area enlargement display; and
selecting either one of two display areas side by side on the display unit in the state of the 2-area enlargement display,
wherein, according to a display area currently selected from the two display areas, displaying a guide indicating positions and sizes of the two separated imaging areas in an unselected display area.

21. A method for controlling an imaging control apparatus comprising an imaging operation member configured to receive a first and a second operation, the method comprising:
performing display control to perform 2-area enlargement display for displaying live view images respectively captured in two horizontally or vertically separated imaging areas, side by side on a display unit, wherein the two horizontally or vertically separated imaging areas are separated along an entire length or an entire height of the display unit; and
performing control,
upon the first operation during the 2-area enlargement display, to perform auto focus without canceling the 2-area enlargement display,
upon the second operation after the first operation during the 2-area enlargement display, to perform imaging by the imaging unit, and
when auto focus is performed in response to the first operation during the 2-area enlargement display and an operation is performed on a specific operation member in a state where the first operation is maintained, to cancel the 2-area enlargement display and display on the display unit the entire live view image captured by the imaging unit.

22. A non-transitory computer-readable storage medium storing a program for causing a computer to execute the method for controlling an imaging control apparatus according to claim 20.

23. A non-transitory computer-readable storage medium storing a program for causing a computer to execute the method for controlling an imaging control apparatus according to claim 21.

24. An electronic apparatus comprising:
a display control unit configured to perform control to perform 2-area enlargement display for displaying partial images respectively at two horizontally or vertically separated positions in an entire image, side by side on a display unit;
a control unit configured to perform control,
in response to a first operation on a first operation member in a state of the 2-area enlargement display, to cancel the 2-area enlargement display and display the entire image on the display unit, and
in response to a second operation on the first operation member, to resume the 2-area enlargement display; and
a selecting unit configured to select either one of two display areas side by side on the display unit in the state of the 2-area enlargement display,
wherein, according to a display area currently selected from the two display areas, displaying a guide indicating positions and sizes of the two separated imaging areas in an unselected display area.

25. A method for controlling an electronic apparatus, the method comprising:
performing display control to perform 2-area enlargement display for displaying partial images respectively at two horizontally or vertically separated positions in an entire image, side by side on a display unit;
performing control,
in response to a first operation on a first operation member in a state of the 2-area enlargement display, to cancel the 2-area enlargement display and display the entire image on the display unit, and
in response to a second operation on the first operation member, to resume the 2-area enlargement display; and
selecting either one of two display areas side by side on the display unit in the state of the 2-area enlargement display,
wherein, according to a display area currently selected from the two display areas, displaying a guide indicating positions and sizes of the two separated imaging areas in an unselected display area.

26. A non-transitory computer-readable storage medium storing a program for causing a computer to execute the method for controlling an electronic apparatus according to claim 25.

27. An imaging control apparatus comprising a memory and at least one processor which function as:
a display control unit configured to perform control to perform 2-area enlargement display for displaying live view images respectively captured in two horizontally or vertically separated imaging areas by an imaging unit, side by side on a display unit;
a control unit configured to perform control,
in response to a first operation on a first operation member in a state of the 2-area enlargement display, to cancel the 2-area enlargement display and display on the display unit an entire live view image captured by the imaging unit, and
in response to a second operation on the first operation member, to resume the 2-area enlargement display;
wherein the first operation member is a specific push button which is pressed in a direction parallel to an optical axis of subject light captured by the imaging unit.

28. An imaging control apparatus comprising a memory and at least one processor which function as:
a display control unit configured to perform control to perform 2-area enlargement display for displaying live view images respectively captured in two horizontally or vertically separated imaging areas by an imaging unit, side by side on a display unit;
a control unit configured to perform control,
in response to a first operation on a first operation member in a state of the 2-area enlargement display, to cancel the 2-area enlargement display and display on the display unit an entire live view image captured by the imaging unit, and
in response to a second operation on the first operation member, to resume the 2-area enlargement display;
wherein, in response to an operation on a second operation member in the state of the 2-area enlargement display, the control unit performs control to cancel the 2-area enlargement display and display on the display unit the entire live view image captured by the imaging unit, and
wherein, the display control unit performs control, when the 2-area enlargement display is canceled in response to the first operation in the state of the 2-area enlargement display, to display the entire live view image in a first screen configuration, and when the 2-area enlargement display is canceled in response to the operation on the second operation member in the state of the 2-area enlargement display, to display the entire live view image in a second screen configuration different from the first screen configuration.

29. An imaging control apparatus comprising a memory and at least one processor which function as:

a display control unit configured to perform control to perform 2-area enlargement display for displaying live view images respectively captured in two horizontally or vertically separated imaging areas by an imaging unit, side by side on a display unit;

a control unit configured to perform control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein, in response to an operation on a second operation member in the state of the 2-area enlargement display, the control unit performs control to cancel the 2-area enlargement display and display the entire live view image on the display unit, and wherein, when the 2-area enlargement display is canceled in response to the operation on the second operation member in the state of the 2-area enlargement display, the control unit does not perform control to resume the 2-area enlargement display even upon the second operation on the first operation member.

30. A method for controlling an imaging control apparatus, the method comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein the first operation member is a specific push button which is pressed in a direction parallel to an optical axis of subject light captured by the imaging unit.

31. A method for controlling an imaging control apparatus comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein, in response to an operation on a second operation member in the state of the 2-area enlargement display, performing control to cancel the 2-area enlargement display and display on the display unit the entire live view image captured by the imaging unit, and performing control, when the 2-area enlargement display is canceled in response to the first operation in the state of the 2-area enlargement display, to display the entire live view image in a first screen configuration, and when the 2-area enlargement display is canceled in response to the operation on the second operation member in the state of the 2-area enlargement display, to display the entire live view image in a second screen configuration different from the first screen configuration.

32. A method for controlling an imaging control apparatus comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein, in response to an operation on a second operation member in the state of the 2-area enlargement display, performing control to cancel the 2-area enlargement display and display the entire live view image on the display unit, and wherein, when the 2-area enlargement display is canceled in response to the operation on the second operation member in the state of the 2-area enlargement display, not performing control to resume the 2-area enlargement display even upon the second operation on the first operation member.

33. A non-transitory computer-readable storage medium storing a program for causing a computer to execute a method for controlling an imaging control apparatus comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein the first operation member is a specific push button which is pressed in a direction parallel to an optical axis of subject light captured by the imaging unit.

34. A non-transitory computer-readable storage medium storing a program for causing a computer to execute a method for controlling an imaging control apparatus comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein, in response to an operation on a second operation member in the state of the 2-area enlargement display, performing control to cancel the 2-area enlargement display and display on the display unit the entire live view image captured by the imaging unit, and performing control, when the 2-area enlargement display is canceled in response to the first operation in the state of the 2-area enlargement display, to display the entire live view image in a first screen configuration, and when the 2-area enlargement display is canceled in response to the operation on the second operation member in the state of the 2-area enlargement display, to display the entire live view image in a second screen configuration different from the first screen configuration.

35. A non-transitory computer-readable storage medium storing a program for causing a computer to execute a method for controlling an imaging control apparatus comprising:

performing control to perform 2-area enlargement display for displaying live view images respectively captured in two horizontally or vertically separated imaging areas by an imaging unit, side by side on a display unit;

performing control, in response to a first operation on a first operation member in a state of the 2-area enlargement display, to cancel the 2-area enlargement display and display on the display unit an entire live view image captured by the imaging unit, and in response to a second operation on the first operation member, to resume the 2-area enlargement display;

wherein, in response to an operation on a second operation member in the state of the 2-area enlargement display, performing control to cancel the 2-area enlargement display and display the entire live view image on the display unit, and wherein, when the 2-area enlargement display is canceled in response to the operation on the second operation member in the state of the 2-area enlargement display, not performing control to resume the 2-area enlargement display even upon the second operation on the first operation member.

* * * * *